Figure 1:
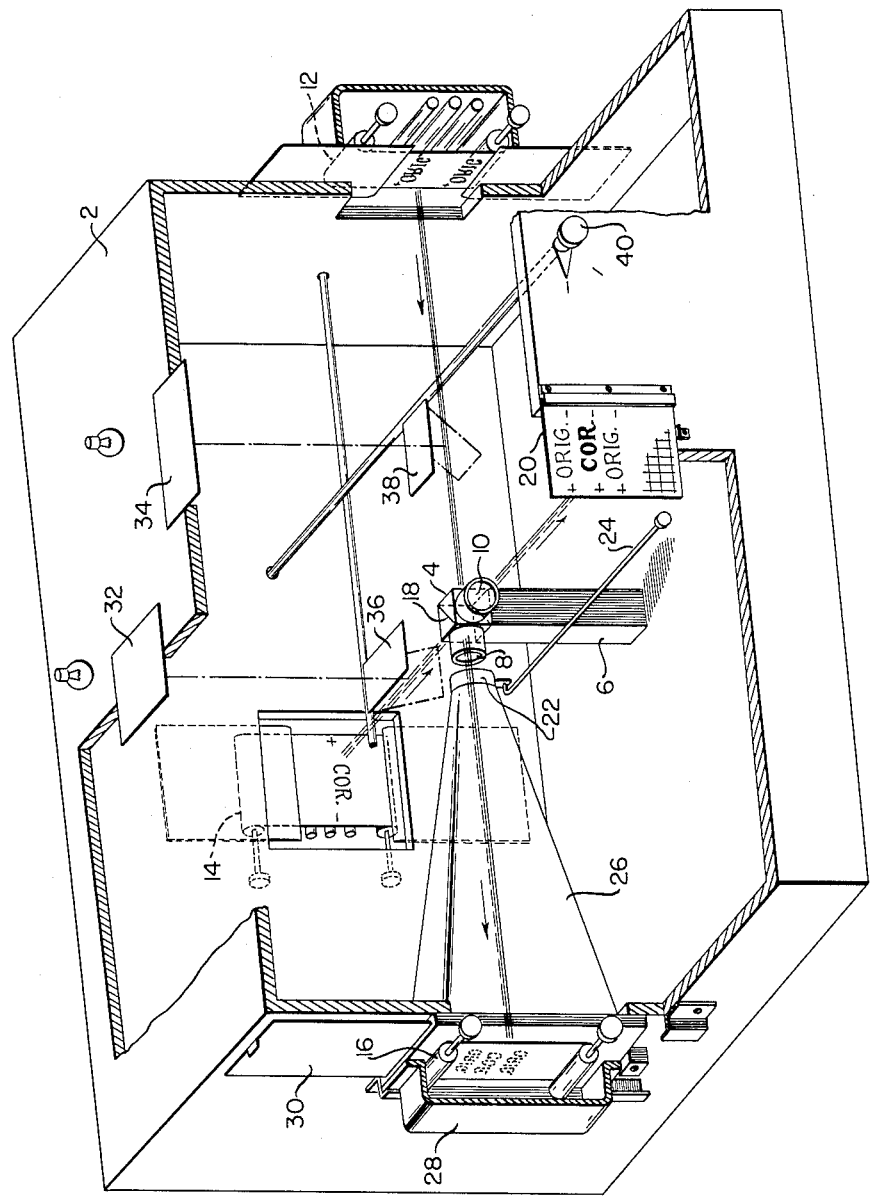

INVENTORS
RENÉ A. HIGONNET
LOUIS M. MOYROUD
BY
ATTORNEYS

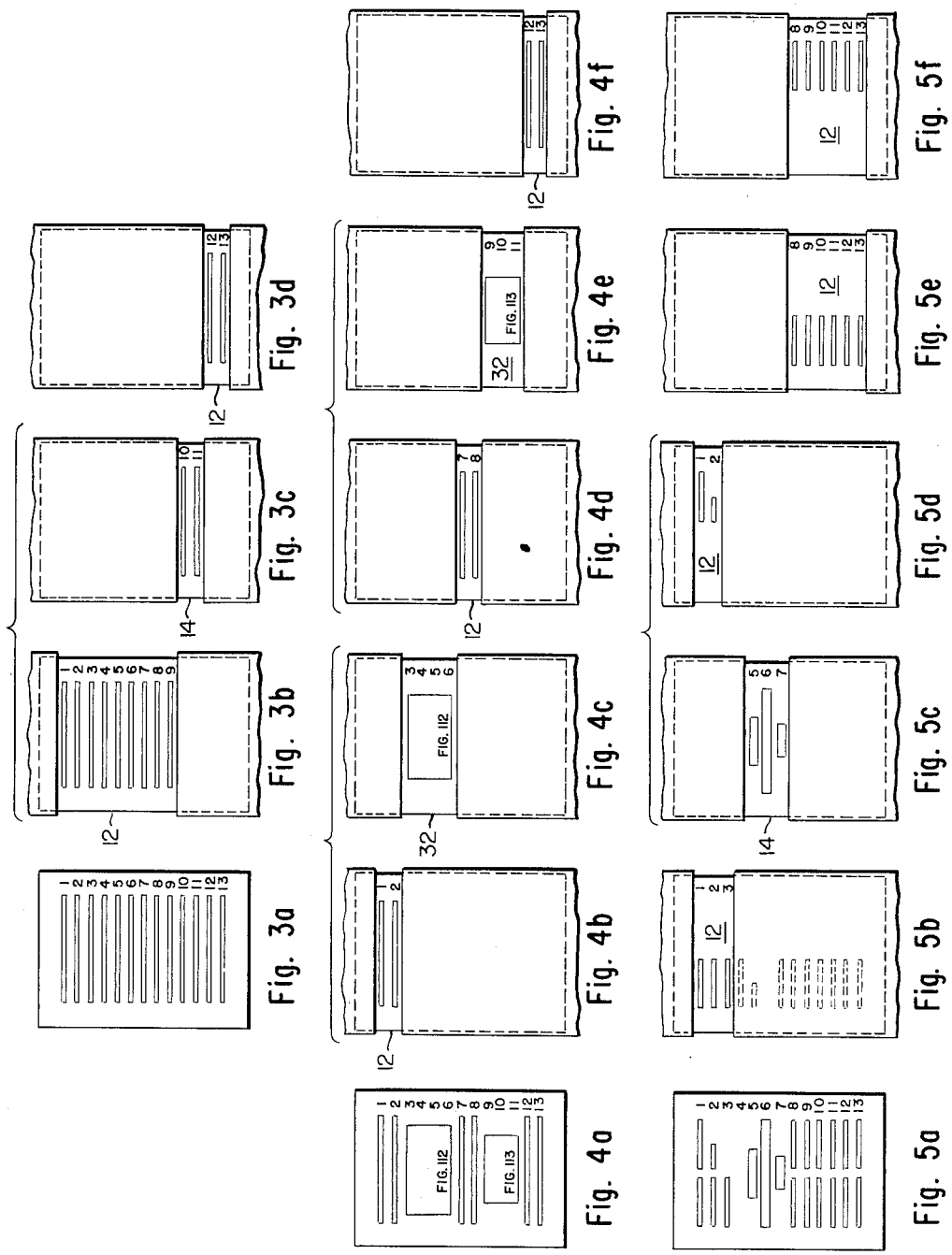

United States Patent Office 2,744,443
Patented May 8, 1956

2,744,443

PHOTOGRAPHIC COPYING DEVICE

Rene A. Higonnet and Louis M. Moyroud, Cambridge, Mass., assignors to Graphic Arts Research Foundation, Inc., Cambridge, Mass., a corporation of Delaware Application April 23, 1952, Serial No. 283,926

4 Claims. (Cl. 88—24)

The present invention relates to photographic composition, and more particularly to a photographic copying device adapted for simultaneous projection of visual matter to be composed from two independently controlled objects or "galleys."

This invention is well adapted for use in conjunction with photographic type composing apparatus of the type described in our copending application, Serial No. 610,336, filed August 11, 1945. This apparatus produces a roll of film having perforations along its edges adapted for cooperation with sprocket driving means, upon which justified lines of type have been exposed. This roll, hereinafter referred to as a "galley," may not be satisfactory for direct use in the photographic engraving process for any one of several reasons. For example, errors in composition not corrected prior to the exposure of the characters, or errors in the text discovered upon reading of the galley proofs, may exist. Also, it may be contemplated to include non-textual material in the printed page, such as pictures, drawings, graphs or other artistic inserts.

It is a principal object of the present invention to provide means for producing a photographic film or plate having composed thereon in proper alignment an entire image of the printed page for use in photographic engraving.

Another object is to provide a plurality of positions from which one or more component parts of the page may be projected.

Another object is to provide means for registering the projected matter both with respect to the sensitized surface and with respect to the matter simultaneously or subsequently projected from other positions.

Another object is to provide visual means for checking the registration of the projections.

Another object is to provide means for visually differentiating the images or portions of images simultaneously projected from two galleys, whereby the image projected from one galley is brighter to the observer, while the relative brightness of the images from both galleys upon the sensitized surface remains unchanged.

With the above objects in view, a principal feature of the present invention is the use of a reflector element having a partially silvered reflecting surface, whereby the light projected from a galley may be split into two paths, and the images from two galleys may thereby be superimposed upon each other in each of two focal planes. The sensitized plate or film is supported in one of these positions, while a plate adapted for visual observation is supported in the other position.

Another feature includes means utilizing special registration marks exposed upon the galley in the photographic type composing apparatus, whereby these marks are registered with guide marks in the plane of focus at the observation position.

Another feature includes selective masking of the visual matter to be composed, and means for independently locating the selected matter with erspect to the sensitized film or sheet.

With the above and other objects in view, other features of the invention comprise certain novel arrangements, structures, relationships and combinations as hereinafter more fully described and as defined in the claims.

Figure 2:
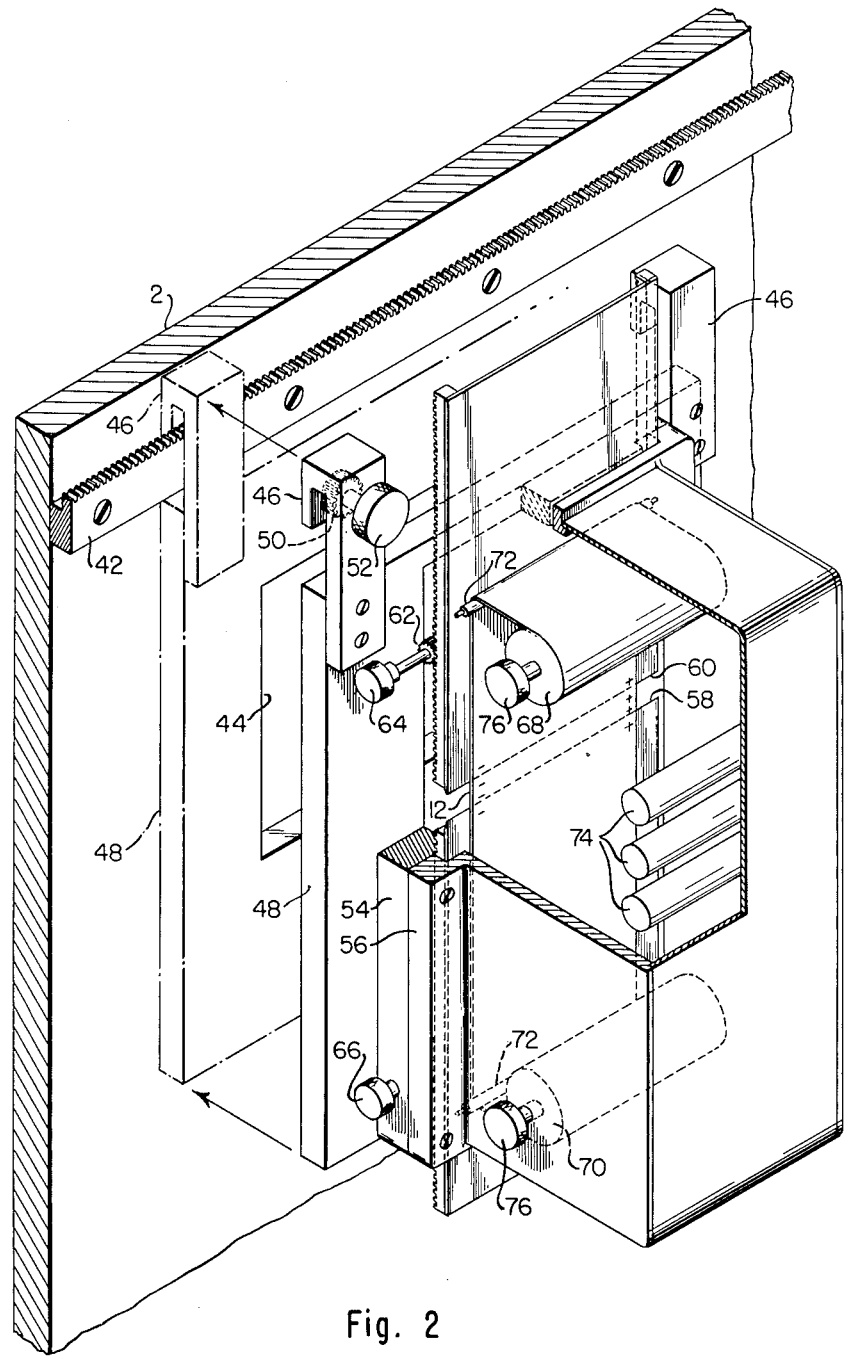

In the drawings Fig. 1 is a pictorial view partly in section showing the principal parts of the apparatus; Fig. 2 is a pictorial view partly in section showing details of a preferred form of construction of the galley supports; Figs. 3a and 3d are views showing the procedure for the deletion of lines from one galley and the insertion therefor of lines from a second galley; Figs. 4a to 4f show the procedure for the insertion of full width figures in the text; and Figs. 5a to 5f show the procedure for composition of double column pages from single column galleys, including the insertion of full width titles.

In Fig. 1, a fixed frame 2 forms a rigid support for the optical system. A reflector element 4 is secured to the frame through a pedestal 6. This pedestal also forms a support for two lens systems 8 and 10 adjacent to the sides of the reflector element. Two film or "galley" rolls 12 and 14 are also supported upon the frame and carry the visual matter to be copied upon a sensitized roll 16 by projection through the lens system 8.

In the embodiment as shown the reflector element comprises a cube made up of two right angle prisms having a partially silvered communicating surface 18. The position of this surface is such that the matter projected from the roll 12 upon the roll 16 passes through the surface, while the matter projected from the roll 14 is reflected from the surface upon the roll 16. Actually, as is well-known, the projected light from both the roll 12 and roll 14 is partially reflected and partially transmitted through the surface, with the result that the images are also formed upon another plane through the lens system 10. A ground glass plate 20 is supported in this plane and provides visual means for observing the adjustments of the projected images upon the film 16. A shutter device 22 having an actuating arm 24 extending from the frame is connected to a pyramidal shaped casing 26, which hermetically seals the film 16 from the light within the frame 2.

The structure of the support for the film 16 is of conventional form, and preferably includes a feature whereby the film is supported within a frame 28 which may be detached from the frame 2 for removal to the dark room. To this end, a dark slide 30 is preferably incorporated into the construction.

The plate 20 for observation preferably bears a grid for the registration of the projections as hereinafter described.

In addition to the two galley rolls or sheets 12 and 14, the apparatus is also provided with two auxiliary projection positions represented by plates 32 and 34. Mirrors 36 and 38, respectively, rotatable by means of knobs such as 40, provide means for reflecting the projections from the auxiliary plates into the optical system described above.

Fig. 2 shows the details of construction of a preferred form of support for the galley rolls. A rack 42 is secured to the frame 2 above an aperture 44 in the frame. The rack is relieved on the side adjacent the frame 2 to receive a pair of suspension hooks 46. A base plate 48 is secured to the hooks and fits over the aperture 44 when the hooks are in place upon the rack 42. A pinion 50 is rotatably supported within each suspension hook in such a manner that when the hook is in place upon the rack the weight of the assembly is supported by the bearing of the hook against the relieved portion of the rack rather than by the bearing of the pinion 50 upon the rack. Each pinion may be manually rotated by a knob 52 to provide means for lateral adjustment of the position of the galley. Obviously, this arrangement may be replaced by any of a large number of devices of a more sophisticated nature, including remote control means.

The base plate 48 has mounted thereon a frame 54 to which is secured a shield 56. The assembly of the frame 54 and shield 56 comprises supporting means for two masking plates 58 and 60, each slidable in a vertical plane. Pinions such as 62 rotated by knobs such as 64 and 66 provide means for independently moving the plates 58 and 60 according to the requirements of composition. The galley roll or sheet 12 is mounted upon two rolls 68 and 70 supported in the shield 56. Rollers such as 72 provide means for holding the roll precisely in a fixed plane adjacent to the plates 58 and 60.

One or more light sources 74 are supported within the shield 56 to provide illumination for projection. Preferably, the brilliance of the sources is adjustable according to the requirements of the sensitized film and other parts of the apparatus, for example by variation of voltage.

Knobs 76 provide means for adjusting the vertical position of the roll. Again, it is obvious that the rudimentary arrangement shown in the figure may be replaced by more elaborate devices which are well-known in the mechanical arts.

Having thus generally described the structure of the apparatus, we next turn to a description of examples of the composing procedure whereby the present invention is utilized to perform certain common requirements of composition.

Turning first to Figs. 3a through 3d, a relatively simple operation is shown, involving the cancellation and substitution of lines in a page of solid type composition. In Fig. 3a, the desired page of 13 lines is shown diagrammatically, the lines being numbered in the right hand margin as they would appear if projected upon the viewing plate 20 (Fig. 1), it being assumed that this plate is similarly marked along its right hand edge.

For convenience, the roll 12, Fig. 1, is designated as the "original" galley, while the roll 14 is designated as the "correction" galley. It is assumed in this example that lines 1 through 9 of the original galley are to be copied, but that the matter subsequent to line 9 for one or several lines is erroneous and is to be replaced by two lines which have been composed upon the correction galley. These lines are to form lines 10 and 11 of the final page, and lines 12 and 13 are again to be copied from the original galley.

The procedure involves two exposures of the film 16. On the first exposure both the original and correction galleys are exposed in the manner shown in Figs. 3b and 3c, bracketed together to denote a single exposure, and on the second exposure only the original galley is exposed as shown in Fig. 3d. At this point the function of the viewing plate 20 may be noted with reference to the example given. As heretofore mentioned, it is assumed that the photographic composing machines upon which the galleys are exposed are provided with means for projecting registration marks such as crosses or lines at the beginning or end of each composed line of type. It is assumed that a cross or plus mark is projected at a fixed distance from the first character in the left hand margin of each line. Also a horizontal line or dash may similarly be projected at the end of each line of type. These registration marks therefore provide means for making the necessary adjustments of the apparatus of Fig. 2 to align the projections, both with respect to the senitized surface and with respect to each other.

As is well known in the optical arts, the partially silvered reflecting surface 18 will transmit a percentage of the light from each galley which is fixed in relation to the percentage reflected from the surface. For example, assume that the surface transmits 70 percent of the total light impinging thereon, and reflects 30 percent. In order for the images of both galleys to be equally bright upon the film 16, the brightness of the illumination of the matter on the roll 14 must be great enough so that 30 percent thereof produces an equal exposure upon the film 16. As shown in Fig. 1, the results is that the matter on the galley roll 14 appears brighter on the viewing plate 20 than the matter on the galley roll 12. Thus, with no sacrifice in the exposure, a visual means is provided for differentiating between the matter on each of the galleys.

Turning next to Figs. 4a through 4f, a similar procedure is shown for inserting fully width cut inserts. In this case it may be assumed that cut inserts are positioned upon the plate 32 for insertion between the lines of text as shown in Fig. 4a. In this case the lines of text are composed consecutively in evenly spaced arrangement upon the galley roll 12. The procedure involves three exposures. In the first exposure the original galley is selectively exposed along with the upper figure, which is mounted on the plate 32. Masking plates like the plates 58 and 60 in Fig. 2 are assumed to be used with the plate 32 but are not shown in Fig. 1. The second exposure is entirely similar, except that the lower figure is substituted on the plate 32 for the upper figure. The third exposure is merely of the original galley.

A final example is shown in Figs. 5a to 5f. It is assumed that a single column of justified lines of type of suitable width for double column text is composed upon the original galley as shown in Fig. 5b. The procedure for obtaining a page as shown in Fig. 5a involves four exposures. The arrangement of the lines of the original galley in two columns is brought about by manipulation of the mechanism of Fig. 2. As in the preceding examples, it will be noted that advantage may be taken of the feature of the invention whereby the matter to be composed may be projected simultaneously from two sources which have been visually registered as heretofore described, with the result that the number of steps involved in the composition may be significantly reduced.

It will be apparent to those skilled in this art that the invention has been described as embodied in certain mechanisms and structures which may be modified or elaborated upon in numerous ways to increase the precision or speed of the composing process without departing from the scope of the invention.

Having thus described our invention, we claim:

1. Apparatus for composing visual matter upon a sensitized sheet including the combination of a support for the sheet, optical projection means for exposing the sheet including a reflector element having a partially transmitting, partially reflecting surface, a support for a first component sheet bearing visual matter to be composed and reference marks in fixed relationship, said matter and marks being in position for projection through said surface upon the sensitized sheet, a support for a second component sheet bearing visual matter to be composed and reference marks in fixed relationship and in position for projection upon the sensitized sheet by reflection from said surface, a viewing sheet in position to receive the light from the first component sheet reflected by said surface and from the second component sheet projected through said surface and having guide marks thereon, and means for independently moving the component sheets to change the relative positions of the respective projections upon the sensitized and viewing sheets by registration of the projected reference marks with the guide marks on the viewing sheet.

2. Apparatus for composing visual matter upon a sensitized sheet to be used in preparation of a printing plate, including the combination of a support for the sheet, optical projection means for exposing the sheet including a reflector element having a partially transmitting, partially reflecting surface, a support for a first component sheet bearing visual matter in position for projection through said surface upon the sensitized sheet, a support for a second component sheet bearing visual matter in position for projection upon the sensitized sheet by reflection from said surface, focusing means being included within said projection means for focusing the images of said matter projected from the component sheets upon the sensitized sheet, each of said supports for the component sheets having adjustable masking means for selecting a portion of said matter to be projected, means for independently moving the component sheets to change the relative positions of the respective projections upon the sensitized sheet, and viewing means permitting observation of the relative positions of said images upon the sensitized sheet, said viewing means being adapted to receive the light from the first component sheet reflected by said surface and from the second component sheet projected through said surface.

3. Apparatus for composing visual matter upon a sensitized sheet including the combination of a support for said sheet, an element having a reflective surface disposed at an angle to said sheet, means to support a first component sheet bearing visual matter in position for projection through said surface upon the sensitized sheet, means to support a second component sheet bearing visual matter in position for projection upon the sensitized sheet by reflection from said surface, focusing means being included within said projection means for focusing the images of said matter projected from the component sheets upon the sensitized sheet, each of said component sheets having an independent source of illumination adjusted to cause the respective images from said component sheets to be of equal brightness upon the sensitized sheet, and a viewing sheet in position to receive the light from the first component sheet reflected by said surface and from the second component sheet projected through said surface, said reflective surface being adapted to direct a brighter image to said viewing sheet from one component sheet than from the other and means for independently moving the component sheets to adjust the relative positions of the respective projections upon the sensitized sheet, said relative positions being observable in the viewing sheet.

4. Apparatus for composing visual matter upon a sensitized sheet including, in combination, a support for the sheet, optical projection means for exposing the sheet including a reflector element having a partially transmitting, partially reflecting surface, a support for a first component sheet bearing visual matter in position for projection through said surface upon the sensitized sheet, a support for a second component sheet bearing visual matter in position for projection upon the sensitized sheet by reflection from said surface, a viewing sheet in position to receive the light from the first component sheet reflected by said surface and from the second component sheet projected through said surface, and means for independently moving the component sheets to adjust the relative positions of the respective projections upon the sensitized sheet, said relative positions being observable in the viewing sheet.

References Cited in the file of this patent
UNITED STATES PATENTS

| | | |
|---|---|---|
| 1,190,370 | Billings | July 11, 1916 |
| 1,591,118 | Friess | July 6, 1926 |
| 1,636,834 | Peters | July 26, 1927 |
| 1,899,032 | Handschiegl | Feb. 28, 1933 |
| 1,959,498 | Planskoy | May 22, 1934 |
| 2,301,274 | Greiser | Nov. 10, 1942 |
| 2,352,914 | Rackett | July 4, 1944 |
| 2,616,330 | Westover | Nov. 4, 1952 |